United States Patent
Zhang et al.

(10) Patent No.: US 11,099,377 B2
(45) Date of Patent: Aug. 24, 2021

(54) LIGHT-ADJUSTING GLASS AND METHOD FOR PREPARING THE SAME

(71) Applicant: BOE TECHNOLOGY GROUP CO., LTD., Beijing (CN)

(72) Inventors: Xiao Zhang, Beijing (CN); Xin Gu, Beijing (CN); Kang Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 142 days.

(21) Appl. No.: 16/329,430

(22) PCT Filed: May 15, 2018

(86) PCT No.: PCT/CN2018/086810
§ 371 (c)(1),
(2) Date: Feb. 28, 2019

(87) PCT Pub. No.: WO2018/233404
PCT Pub. Date: Dec. 27, 2018

(65) Prior Publication Data
US 2019/0212542 A1  Jul. 11, 2019

(30) Foreign Application Priority Data
Jun. 20, 2017 (CN) .......................... 201710469625.6

(51) Int. Cl.
*G02B 26/00* (2006.01)
*G02B 5/136* (2006.01)
(Continued)

(52) U.S. Cl.
CPC .............. *G02B 26/004* (2013.01); *G02B 5/12* (2013.01); *G02B 5/13* (2013.01); *G02B 5/136* (2013.01); *G02B 26/02* (2013.01); *G02F 1/19* (2013.01)

(58) Field of Classification Search
CPC .... G02B 26/005; G02B 26/02; G02B 26/004; G02B 26/007; G02B 26/023;
(Continued)

(56) References Cited

U.S. PATENT DOCUMENTS

| 2004/0179259 A1* | 9/2004 | Fujii ................... G02B 26/004 359/297 |
| 2011/0088758 A1* | 4/2011 | Yagi ........................ C03C 8/16 136/252 |

(Continued)

FOREIGN PATENT DOCUMENTS

| CN | 1239229 A | 12/1999 |
| CN | 202256935 | * 5/2012 ............... G02F 1/01 |

(Continued)

OTHER PUBLICATIONS

PCT International Search Report, Application No. PCT/CN2018/086810, dated Jul. 31, 2018, 6 pages with English translation.
(Continued)

*Primary Examiner* — William R Alexander
*Assistant Examiner* — Sharrief I Broome
(74) *Attorney, Agent, or Firm* — Armstrong Teasdale LLP (57) ABSTRACT

The disclosure provides a light-adjusting glass, including an outer light transmissive layer and an inner light transmissive layer, a microstructure layer bonded to or disposed on an inner surface of the outer light transmissive layer and provided with a reflective microstructure, a sealing member bonded to an end portion of the outer light transmissive layer and an end portion of the inner light transmissive layer, the sealing member, the microstructure layer and the inner light transmissive layer enclosing a space having a predetermined volume. A predetermined amount of a first substance is disposed within the space. The disclosure also provides a method for preparing a light-adjusting glass. The light-
(Continued)

adjusting glass of the present disclosure does not require an electric field to control the light-adjusting.

19 Claims, 6 Drawing Sheets

(51) Int. Cl.
  *G02B 5/13* (2006.01)
  *G02F 1/19* (2019.01)
  *G02B 5/12* (2006.01)
  *G02B 26/02* (2006.01)

(58) Field of Classification Search
  CPC .. G02B 26/0841; G02B 1/06; G02B 26/0833; G02B 26/001; G02B 3/14; G02B 5/201; G02B 1/12; G02B 27/0172; G02B 5/003; G02B 2207/115; G02B 26/00; G02B 26/04; G02B 26/06; G02B 5/1842; G02B 17/023; G09G 3/348; G09G 3/3433; G09G 3/3466; G09G 2300/0473; G09G 2300/04; G09G 2300/0426; G09G 2300/0452; G09G 2300/08; G09G 3/34; G09G 3/3426; G09G 5/10; G09G 2300/0404; G09G 2300/0876; G09G 2310/061; G09G 3/20; G09G 3/2003; G09G 3/3208; G09G 2300/023; G09G 2300/0456; G09G 2300/0465; G02F 1/167; G02F 1/0128; G02F 1/0131; G02F 1/13306; G02F 1/163; G02F 1/172; G02F 1/0018; G02F 1/0105; G02F 1/133514; G02F 1/137; G02F 1/155; G02F 1/157; G02F 1/16766; G02F 1/21; G02F 2001/1678; G02F 2201/44; G02F 1/0102; G02F 1/0121; G02F 1/0147; G02F 1/0316; C09B 29/081; C09B 31/043; C09B 55/009; C09B 23/04; C09B 29/0003; C09B 31/14; C09B 67/0033; C09B 13/02; C09B 1/26; C09B 1/262; C09B 1/285; C09B 23/0075; C09B 23/145; C09B 29/0059; C09B 29/0077; C09B 29/0081; C09B 29/0085; C09B 29/26; C09B 29/36; C09B 29/363
  See application file for complete search history.

(56) References Cited

U.S. PATENT DOCUMENTS

| | | | | |
|---|---|---|---|---|
| 2012/0307347 | A1* | 12/2012 | Clapp | G02F 1/1685 359/296 |
| 2014/0092464 | A1* | 4/2014 | Arsenault | G01N 21/7743 359/290 |
| 2015/0015931 | A1* | 1/2015 | Farrand | C09B 1/285 359/290 |
| 2015/0338636 | A1* | 11/2015 | Choi | G02B 26/005 359/290 |
| 2016/0291437 | A1* | 10/2016 | Ogawa | G02F 1/161 |

FOREIGN PATENT DOCUMENTS

| | | | | |
|---|---|---|---|---|
| CN | 202256935 | U | 5/2012 | |
| CN | 103197438 | A | 7/2013 | |
| CN | 105711184 | A | 6/2016 | |
| CN | 106543380 | * | 3/2017 | ............ C08F 283/06 |
| CN | 106543380 | A | 3/2017 | |
| CN | 206070867 | U | 4/2017 | |
| CN | 107065377 | A | 8/2017 | |
| JP | 2005091533 | A | 4/2005 | |
| WO | 0061383 | A2 | 10/2000 | |

OTHER PUBLICATIONS

PCT Written Opinion, Application No. PCT/CN2018/086810, dated Jul. 31, 2018, 5 pages: with English translation of relevant part.
China First Office Action, Application No. 201710469625.6, dated Mar. 26, 2019, 16 pps.: with English translation.

* cited by examiner

LIGHT-ADJUSTING GLASS AND METHOD FOR PREPARING THE SAME

CROSS REFERENCE TO RELATED APPLICATIONS

This patent application is a National Stage Entry of PCT/CN2018/086810 filed on May 15, 2018, which claims the benefit and priority of Chinese Patent Application No. 201710469625.6 filed on Jun. 20, 2017, the disclosures of which are incorporated by reference herein in their entirety as part of the present application.

BACKGROUND

The disclosure generally relates to a light-adjusting device and a method for preparing the same, in particular, to a light-adjusting glass and a method for preparing the same.

A light-adjusting glass is a functional glass product that can be switched between a light transmissive state and a light non-transmissive state. At present, the light-adjusting glass on the market is mainly an electric field controlled light-adjusting glass. The operating principle is that, by filling a liquid crystal layer between two layers of glass, when the liquid crystal layer is not energized by an electric field, the liquid crystal molecules are irregularly dispersed, so that light cannot pass through, thus the light-adjusting glass is in the light non-transmissive state, and when the liquid crystal layer is energized by the electric field, the liquid crystal molecules are regularly arranged under the action of the electric field, so that the light passes through, thus the light-adjusting glass is in the light transmissive state.

The existing electronically controlled light-adjusting glass has a high difficulty in the preparing process, and in particular, the larger the size of the light-adjusting glass, the more difficult it is to ensure quality. In addition, the electronically controlled light-adjusting glass needs to be energized to exhibit a light transmissive appearance, and thus the electricity cost is generated during using and there are restrictions to the installation situation.

BRIEF DESCRIPTION

In view of this, the embodiments of the present disclosure provide a novel type light-adjusting glass, which does not need to be controlled by an electric field, so that the electricity cost will not be generated during using, and does not need to be installed to a situation having power source nearby.

The light-adjusting glass of the embodiments of the disclosure includes an outer light transmissive layer and an inner light transmissive layer, a microstructure layer bonded to or disposed on an inner surface of the outer light transmissive layer and provided with a reflective microstructure, a sealing member bonded to an end portion of the outer light transmissive layer and an end portion of the inner light transmissive layer, the sealing member, the microstructure layer and the inner light transmissive layer enclosing a space having a predetermined volume, wherein a predetermined amount of a first substance is disposed within the space, and a volume of the predetermined amount of the first substance in a solid state is the predetermined volume, and a volume of the predetermined amount of the first substance in a liquid state is smaller than the predetermined volume.

The embodiments of the disclosure further provide a method for preparing the above-described light-adjusting glass, including preparing an outer light transmissive layer and an inner light transmissive layer, preparing a microstructure layer having a reflective microstructure and bonding the microstructure layer to an inner surface of the outer light transmissive layer, or forming the microstructure layer having a reflective microstructure on an inner surface of the outer light transmissive layer, fixing one end of a sealing member to an end portion of the outer light transmissive layer, and forming a cavity by the sealing member and the microstructure layer, injecting a first substance in a liquid state into the cavity and cooling the first substance below a freezing point of the first substance to solidify the first substance into a solid state, bonding a surface of the inner light transmissive layer to a surface of the first substance and bonding an end portion of the inner light transmissive layer to other one end of the sealing member, wherein a volume of the first substance in the liquid state is smaller than a volume of the first substance in the solid state.

The light non-transmissive state of the light-adjusting glass of the embodiments of the present disclosure is achieved by the total reflection of light which is from the outer light transmissive layer and passes through the microstructure layer and then enters into the cavity when the first substance is in the liquid state. The light transmissive state is achieved by increasing the transmittance of light which is caused by completely filling the first substance in the solid state into the space between the microstructure layer and the inner light transmissive layer. Thereby the dependence of the light-adjusting glass on the electric field is eliminated, a new temperature-controlled light-adjusting glass is realized, and preparing and using costs are greatly reduced.

DETAILED DESCRIPTION

The embodiments of the present disclosure will be described in detail below with reference to the accompanying drawings.

Figure 1:
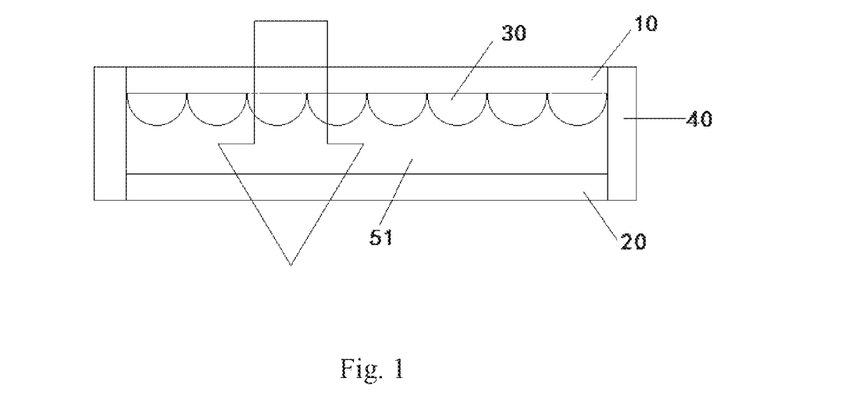
FIG. 1 is a schematic structural view of a light-adjusting glass in a light transmissive state according to an embodiment of the present disclosure.

FIG. 1 is a schematic structural view of a light transmissive state of a light-adjusting glass according to an embodiment of the present disclosure. As shown in FIG. 1, the light-adjusting glass of the embodiments of the present disclosure includes an outer light transmissive layer 10, an inner light transmissive layer 20, a microstructure layer 30, a sealing member 40, and a first substance in a solid state 51. It should be noted that, the size of the light-adjusting glass shown in FIG. 1 is only schematic, and does not represent the actual size ratio of the light-adjusting glass. The light-adjusting glass generally has a larger area and a smaller thickness.

Wherein, the outer light transmissive layer 10 is used for receiving the light incident from the outside. The outer light transmissive layer 10 may be made of a light transmissive material such as glass or resin, etc.

The microstructure layer 30 is bonded to an inner surface of the outer light transmissive layer 10, and a large number of reflective microstructures are adjacently arranged on an inner surface of the microstructure layer 30. Referring to a plurality of hemispherical microstructures illustratively shown in FIG. 1, wherein a diameter of each hemispherical microstructure may be, for example, in the range of 10 to 20 micrometers, and the height of each hemispherical microstructure may be, for example, in the range of 5 to 10 micrometers. The microstructure layer 30 may be made of a light transmissive material such as glass or resin, etc.

What has been given above is an example in which the outer light transmissive layer 10 and the microstructure layer 30 are separately prepared and then are bonded, but the disclosure is not limited thereto. In one embodiment of the present disclosure, the microstructure layer 30 may be formed by forming a plurality of reflective microstructures adjacently arranged by, for example, performing imprint process and etching process on the inner surface of the outer light transmissive layer 10.

The sealing member 40 may be bonded to an end portion of the outer light transmissive layer 10 and an end portion of the inner light transmissive layer 20 by, for example, a sealant. Although only the example in which an end surface of the outer light transmissive layer 10 and an end surface of the inner light transmissive layer 20 are bonded to a side surface of the sealing member 40 is shown in FIG. 1, the present disclosure is not limited thereto, and an end surface of the sealing member 40 may also be bonded to a side surface of the end portion of the outer side light transmissive layer 10 and/or a side surface of the end portion of the inner light transmissive layer 20. The material of the sealing member 40 in the embodiments of the present disclosure is not limited, and may be made of, for example, a metal, an alloy, a resin, a glass, or the like.

As shown in FIG. 1, an inner surface of the sealing member 40, the inner surface of the microstructure layer 30, and an inner surface of the inner light transmissive layer 20 enclose a sealed space having a predetermined volume. A predetermined amount of a first substance is disposed within the sealed space, and a volume of the predetermined amount of the first substance in the solid state is the volume of the sealed space. That is, the sealed space is completely filled by the first substance in the solid state 51. Thus, light incident from the outer light transmissive layer 10 can pass through the microstructure layer 30 and enter into the first substance in the solid state 51, and then pass out from the inner light transmissive layer, so that the light-adjusting glass exhibits a light transmissive state.

Figure 2:
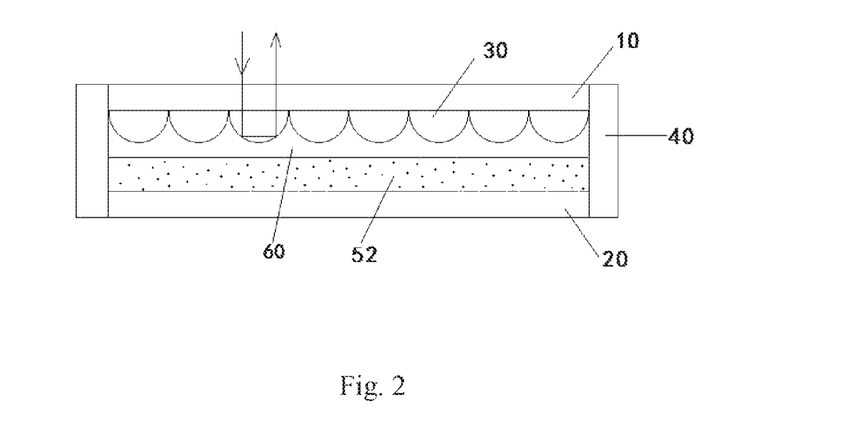
FIG. 2 is a schematic structural view of the light-adjusting glass shown in FIG. 1 in a light non-transmissive state.

FIG. 2 is a structural schematic view of the light-adjusting glass shown in FIG. 1 in the light non-transmissive state. As shown in FIG. 2, when the ambient temperature around the light-adjusting glass reaches above a freezing point of the first substance, a first substance in the solid state 51 melts into a first substance in the liquid state 52, and the volume of the first substance in the liquid state 52 is smaller than the volume of the sealed space inside the light-adjusting glass, thereby forming a cavity 60 within the sealed space. In the case where the light-adjusting glass shown in FIG. 2 is placed horizontally, the cavity 60 separates the microstructure layer 30 from the first substance in the liquid state 52. Since a refractive index of the cavity 60 is lower, the light incident from the outer transmissive layer 10 enters the microstructure layer 30 and then is partial reflected or totally reflected at an interface of the microstructure layer 30 being in contact with the cavity 60, that is, a small amount of the light incident from the outside passes through or the light incident from the outside is difficult to pass through the cavity 60 and then passes through the first substance in the liquid state 52 and the inner light transmissive layer. Seen from the lower side of the inner light transmissive layer 20, the light-adjusting glass exhibits a light semi-transmissive or light non-transmissive state.

The light non-transmissive state or the light semi-transmissive state of the light-adjusting glass of the embodiments of the present disclosure is achieved by the total reflection or the partial reflection of light which is from the outer light transmissive layer and passes through the microstructure layer and then enters into the cavity when the first substance is in the liquid state. The light transmissive state is achieved by increasing the transmittance of light which is caused by completely filling the first substance in the solid state into the space between the microstructure layer and the inner light transmissive layer. The dependence of the light-adjusting glass of the embodiments of the disclosure on the electric field is eliminated, and the light is automatically adjusted by changing the temperature of the environment around the light-adjusting glass to change the structure of the light-adjusting glass, thereby realizing a new temperature-controlled light-adjusting glass, and at the same time, the preparing cost, the installing costs, and using costs are significantly reduced.

Although the embodiments of the present disclosure are not specifically limited, those skilled in the art will readily understand that the technical solutions of the present disclosure are applicable to structures that can be horizontally placed, installed, fixed, etc., such as roof, horizontal glass articles, or other horizontal tops of closed structures or other horizontal top of the non-closed structure, or the inclined surface where the angle of inclination is limited (the angle of inclination should not cause the first substance to contact the microstructure layer in the liquid state).

According to actual needs, the first substance in the light-adjusting glass of the embodiments of the present disclosure may be selected from substances having different freezing points. In one embodiment of the disclosure, the freezing point of the first substance is in a range from −10 to 25° C. For example, when the light-adjusting glass is required to exhibit a light transmissive state below—10° C., and exhibit a light non-transmissive state above −10° C., a substance having a freezing point of about −10° C. may be selected as the first substance, for example, an oil, which has a lower freezing point and exhibit a light-transmissive state when solidified, can be used as the first substance. When the light-adjusting glass is required to exhibit a light transmissive state below 0° C., and exhibit a light non-transmissive state above 0° C., a substance having a freezing point of about 0° C. may be selected used as the first substance. When the light-adjusting glass is required to exhibit a light transmissive state below 25° C., and exhibit the light non-transmissive state above 25° C., a substance having a freezing point of about 25° C. may be selected as the first substance.

In another embodiment of the disclosure, the freezing point of the first substance can be selected, for example, from the range of 0 to 20° C. For example, when the light-adjusting glass is required to exhibit a light transmissive state below 0° C., and exhibit a light non-transmissive state above 0° C., for example, water having a freezing point of 0° C. may be selected as the first substance. When the light-adjusting glass is required to exhibit a light transmissive state below about 16° C., and exhibit a light non-transmissive state above about 16° C., for example, acetic acid having a freezing point of 16.6° C. may be selected as the first substance.

The specific object of the above first substance is merely exemplary, and the present disclosure is not limited to the above-exemplified first substance, as long as the volume of the first substance in the solid state is larger than the volume of the first substance in the liquid state and the substance, which exhibits a light transmissive state when solidified, can be selected as the first substance in the present disclosure. Based on a demarcation point temperature where the light-adjusting glass needs to be switched from the light transmissive state to the light non-transmissive state, a substance having a freezing point of that temperature may be selected as the first substance.

In one embodiment of the present disclosure, in order to increase the incidence rate of external light, the difference between the refractive index of the microstructure layer 30 in the light-adjusting glass and the refractive index of the outer light transmissive layer 10 may be in the range of 0 to 0.2. For example, when the outer light transmissive layer 10 and the microstructure layer 30 which are bonded to each other are made of the same material, or when the microstructure layer 30 is directly disposed on the inner surface of the outer light transmissive layer 10, the difference between the two refractive index is 0. When the outer light transmissive layer 10 is made of glass, its refractive index is, for example, about 1.4 to 1.6, and when the microstructure layer 30 is made of resin, its refractive index is, for example, 1.58, and the difference between the two refractive index is about 0.02 to 0.18.

In another embodiment of the present disclosure, in order to increase the incidence rate of external light, the difference between the refractive index of the first substance in the solid state 51 and the refractive index of the microstructure layer 30 may be in the range of 0 to 0.35. For example, when the first substance in the solid state is ice, its refractive index is about 1.3, the microstructure layer 30 can be selected from a glass having a refractive index of 1.4 to 1.6, and the difference between the two refractive indexes is about 0.1 to 0.3. Based on the refractive index of the first substance selected, it can also select a suitable material having a refractive index close to or even is the same as that of the first substance selected among the light transmissive materials as a material for preparing the microstructure layer 30.

In the embodiments of the present disclosure, after determining the light-adjusting temperature of the light-adjusting glass according to needs, the first substance having the freezing point that meets the requirement is selected, the refractive index of the first substance is determined, and a light transmissive material having a refractive index close to or even is the same as that of the first substance is selected to fabricate the microstructure layer 30, and the material having a refractive index close to or is the same as that of the microstructure layer 30 is selected to fabricate the outer light transmissive layer 10 and/or the inner light transmissive layer 20, so as to improve the transmittance of the light-adjusting glass.

Figure 3:
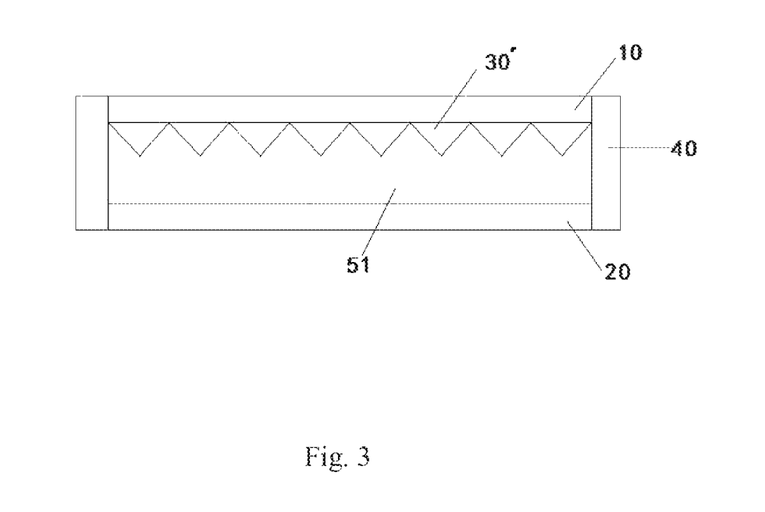
FIG. 3 is a schematic structural view of a light-adjusting glass in a light non-transmissive state according to another embodiment of the present disclosure.
Figure 4:
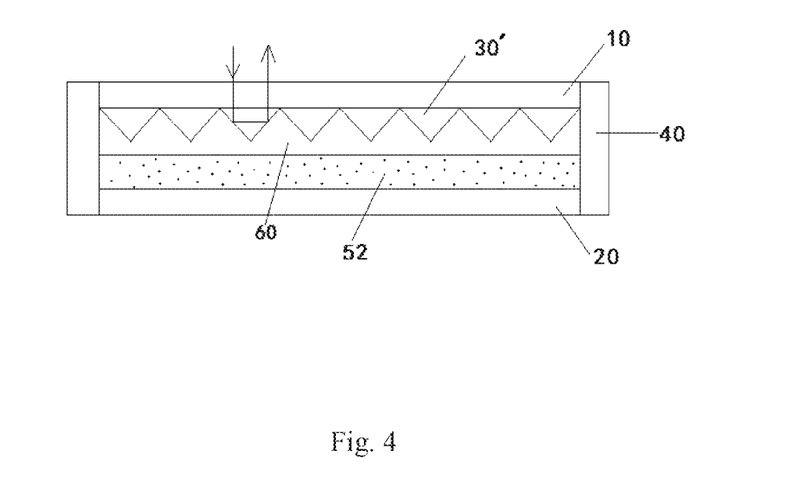
FIG. 4 is a schematic structural view of the light-adjusting glass shown in FIG. 3 in a light non-transmissive state.

FIG. 3 is a schematic structural view of a light-adjusting glass in a light non-transmissive state according to another embodiment of the present disclosure, and FIG. 4 is a structural schematic view of the light-adjusting glass shown in FIG. 3 in a light non-transmissive state.

As shown in FIGS. 3 and 4, in addition to being constructed as the hemispherical microstructure shown in FIGS. 1 and 2, the microstructure layer 30 in the embodiments of the present disclosure may be constructed as a microstructure layer 30' having a prismatic microstructure or a prismatic microstructure of other angles shown in FIGS. 3 and 4. This can also achieve that, when the first substance within the light-adjusting glass is in a solid state, light incident from the outer light transmissive layer 10 passes through the microstructure layer 30', enters the first substance in the solid state 51, and then passes out from the inner light transmissive layer 20, so as to achieve a light transmissive state of the light-adjusting glass, and when the first substance is in a liquid state, light incident from the outer light transmissive layer 10 is partially reflected or totally reflected at an interface of the microstructure layer 30' contacted with the cavity 60, so as to achieve a light semi-transmissive or light non-transmissive state of the light-adjusting glass.

Figure 5:
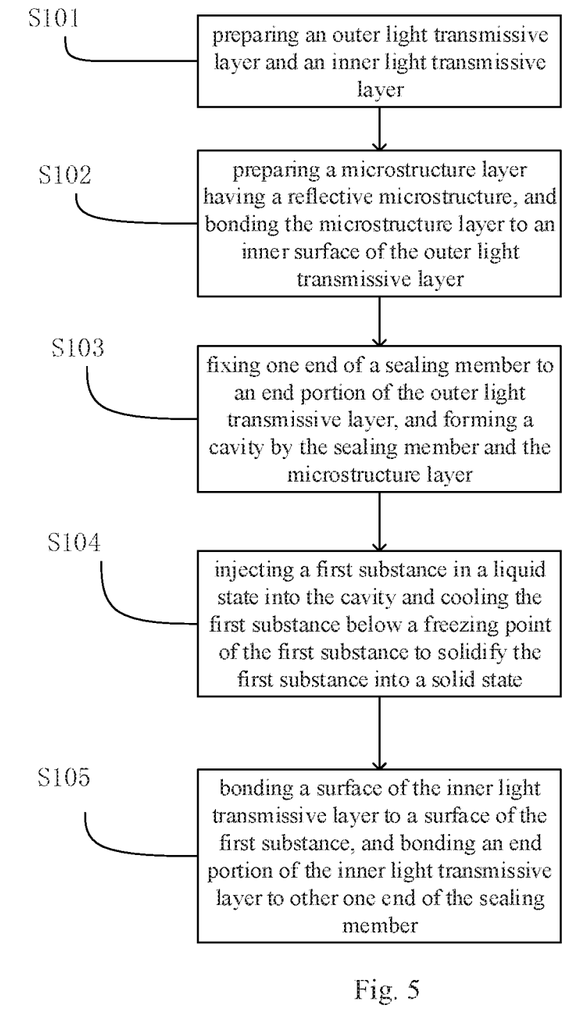
FIG. 5 is a schematic flow chart of a method for preparing a light-adjusting glass according to an embodiment of the present disclosure.

FIG. 5 is a schematic flow chart of a method for preparing a light-adjusting glass according to an embodiment of the present disclosure, and FIGS. 6A-6E are schematic views of respective steps of preparing a light-adjusting glass according to an embodiment of the present disclosure.

As shown in FIG. 5 and FIGS. 6A-6E, the method for preparing a light-adjusting glass according to an embodiment of the present disclosure includes the following steps:

S101: preparing an outer light transmissive layer and an inner light transmissive layer.

For example, the outer light transmissive layer and the inner light transmissive layer may be prepared in a prescribed size using glass or resin, or may be prepared by cutting the preformed glass or resin sheet to have a prescribed size.

S102: preparing a microstructure layer having a reflective microstructure, and bonding the microstructure layer to an inner surface of the outer light transmissive layer.

Figure 6A:
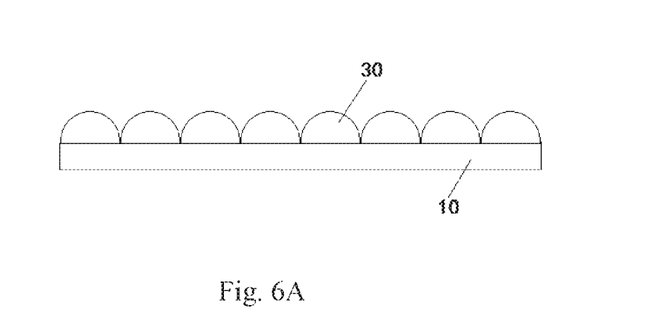
FIGS. 6A-6E are schematic views of respective steps of preparing a light-adjusting glass according to an embodiment of the present disclosure.

After the microstructure layer is formed of a light transmissive material such as glass or resin, the microstructure layer 30 is bonded to the inner surface of the outer light transmissive layer 10, as shown in FIG. 6A. The microstructure layer can be prepared by forming a plurality of reflective microstructures adjacently arranged by, for example, performing patterning process such as imprint process or exposing and developing, etc. on a surface of glass or resin sheet. As shown in FIG. 1 or FIG. 3, a plurality of hemispherical or prismatic microstructures are arranged on the inner surface of the microstructure layer 30. Wherein, the size of base portion of each microstructure may be, for example, in the range of 10 to 20 micrometers, and the height of each microstructure may be, for example, in the range of 5 to 10 micrometers.

Alternatively, in one embodiment of the present disclosure, the microstructure layer can be formed by forming a plurality of reflective microstructures adjacently arranged by, for example, directly performing patterning process such as imprint process or exposing and developing, etc. on the inner surface of the outer light transmissive layer.

S103: fixing one end of a sealing member to an end portion of the outer light transmissive layer, and forming a cavity by the sealing member and the microstructure layer.

Figure 6B:
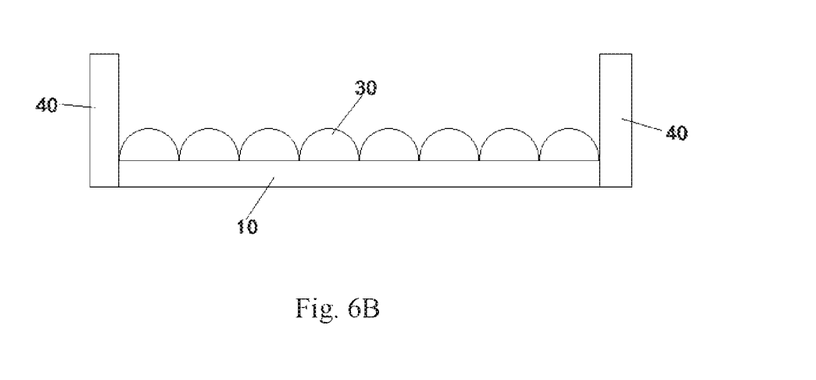

As shown in FIG. 6B, the sealing member 40 may be bonded to the end portion of the outer light transmissive layer 10 by, for example, a sealant. In addition to the manner in which the end surface of the outer light transmissive layer 10 is bonded to the side surface of the sealing member 40 as shown in FIG. 6B, it is also possible that the end surface of the sealing member 40 is bonded to the side surface of the end portion of the outer light transmissive layer 10.

S104: injecting a first substance in a liquid state into the cavity and cooling the first substance below a freezing point of the first substance to solidify the first substance into a solid state.

Figure 6C:
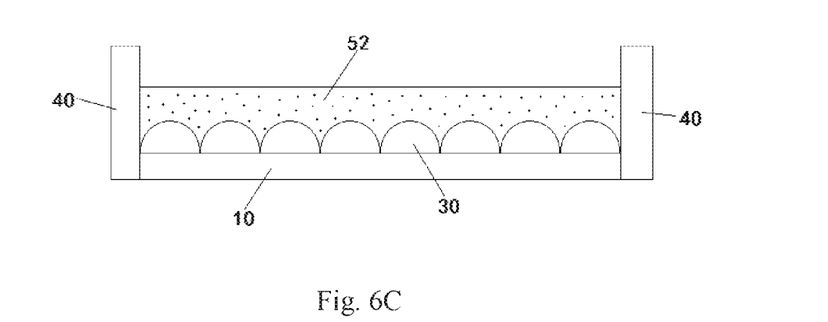
Figure 6D:
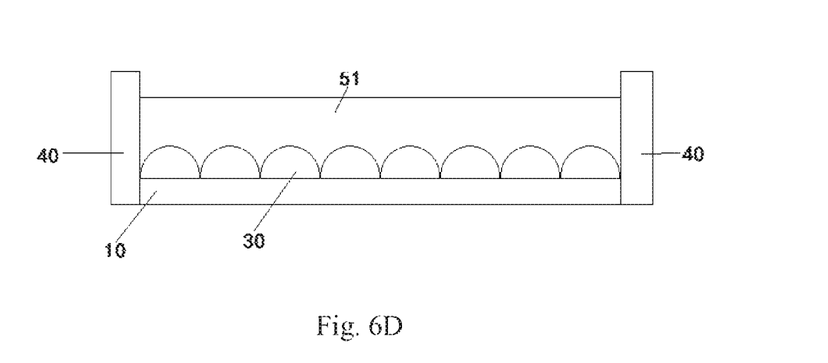

As shown in FIG. 6C, a first substance in a liquid state 52 is injected into a cavity formed by the inner surface of the sealing member 40 and the inner surface of the microstructure layer 30, and then the first substance is cooled below a freezing point of the first substance, so that the first substance is solidified into a first substance in a solid state 51, as shown in FIG. 6D. A volume of the first substance in the solid state 51 is larger than a volume of the first substance in the liquid state 52.

In the embodiments of the present disclosure, the first substance injected into the cavity may be, for example, a substance, a volume of which in the solid state is larger than a volume of which in the liquid and which exhibit a light transmissive state when solidified, such as water, oil, and acetic acid, etc. Based on a demarcation point temperature where the light-adjusting glass needs to be switched from the light transmissive state to the light non-transmissive state, a substance having a freezing point of that temperature may be selected as the first substance.

S105: bonding a surface of the inner light transmissive layer to a surface of the first substance, and bonding an end portion of the inner light transmissive layer to other one end of the sealing member.

Figure 6E:
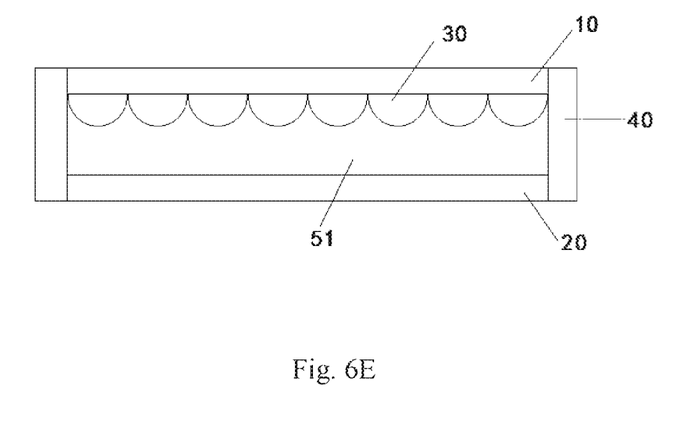

As shown in FIG. 6E, a surface of the inner light transmissive layer 20 is bonded to a surface of the first substance in the solid state 51, and an end portion of the inner light transmissive layer 20 is bonded to an end portion of the sealing member 40 to form the light-adjusting glass.

In one embodiment of the present disclosure, after S104, the method for preparing the light-adjusting glass further includes a step of planarizing the surface of the first substance in the solid state 51, to increase the degree of bonding between the inner light transmissive layer 20 and the first substance in the solid state 51. It is ensured that the volume of the first substance in the solid state 51 is the same as the volume of a space enclosed by the sealing member, the microstructure layer and the inner light transmissive layer as much as possible.

In another embodiment of the present disclosure, in S104, the first substance in the liquid state may be filled in the cavity formed by the inner surface of the sealing member 40 and the inner surface of the microstructure layer 30, and then the first substance is cooled below the freezing point of the first substance, such that the first substance is solidified into the first substance in the solid state. At this time, due to the volume expansion of the first substance during solidification, the portion of the first substance in the solid state that is higher than the plane of the end surface of the sealing member can be removed, and then the surface of the inner light transmissive layer is fixed to the surface of the first substance in the solid state and the end surface of the sealing member.

The embodiments of the present disclosure have been described above, but the present disclosure is not limited to the specific embodiments described above, and various modifications and changes can be made to the above embodiments without departing from the inventive concept. The embodiments after being modified and changed are all within the scope of the claimed disclosure.

What is claimed is:

1. A light-adjusting glass comprising:
an outer light transmissive layer and an inner light transmissive layer;
a microstructure layer bonded to or disposed on an inner surface of the outer light transmissive layer and provided with a reflective microstructure; and
a sealing member bonded to an end portion of the outer light transmissive layer and an end portion of the inner light transmissive layer, wherein the sealing member, the microstructure layer, and the inner light transmissive layer enclose a space having a predetermined volume,
wherein a predetermined amount of a first substance is disposed within the space, wherein the first substance can be transformed between a solid state and a liquid state,
wherein when the first substance is in the solid state, a volume of the predetermined amount of the first substance is the predetermined volume, such that the light-adjusting glass exhibits a light transmissive state, and wherein when the first substance is in the liquid state, a volume of the predetermined amount of the first substance is smaller than the predetermined volume, such that the light-adjusting glass exhibits a light non-transmissive state, and
wherein when the first substance is in the liquid state, a cavity is formed within the space, wherein the cavity separates the microstructure layer from the first substance.

2. The light-adjusting glass according to claim 1, wherein a freezing point of the first substance is in a range of −10 to 25° C.

3. The light-adjusting glass according to claim 1, wherein a freezing point of the first substance is in a range of 0 to 20° C.

4. The light-adjusting glass according to claim 1, wherein a difference between a refractive index of the microstructure layer and a refractive index of the outer light transmissive layer is in a range of 0 to 0.2.

5. The light-adjusting glass according to claim 1, wherein a difference between a refractive index of the first substance in the solid state and a refractive index of the microstructure layer is in a range of 0 to 0.35.

6. The light-adjusting glass according to claim 1, wherein the reflective microstructure comprises one of a hemispherical microstructure and a prismatic microstructure.

7. The light-adjusting glass according to claim 1, wherein the first substance is selected from a group consisting of water, oil, and acetic acid.

8. A method for preparing a light-adjusting glass, the method comprising:
preparing an outer light transmissive layer and an inner light transmissive layer;
preparing a microstructure layer having a reflective microstructure and bonding the microstructure layer to an inner surface of the outer light transmissive layer, or forming the microstructure layer having a reflective microstructure on an inner surface of the outer light transmissive layer;
fixing one end of a sealing member to an end portion of the outer light transmissive layer, and forming a cavity by the sealing member and the microstructure layer;
injecting a first substance in a liquid state into the cavity and cooling the first substance below a freezing point of the first substance to solidify the first substance into a solid state; and bonding a surface of the inner light transmissive layer to a surface of the first substance and bonding an end portion of the inner light transmissive layer to other one end of the sealing member, wherein the first substance can be transformed between a solid state and a liquid state, and wherein a volume of the first substance in the liquid state is smaller than a volume of the first substance in the solid state, wherein when the first substance is in the solid state, the light-adjusting glass exhibits a light transmissive state, and wherein when the first substance is in the liquid state, the light-adjusting glass exhibits a light non-transmissive state, and wherein when the first substance is in the liquid state, a cavity is formed within the space, wherein the cavity separates the microstructure layer from the first substance.

9. The method according to claim 8, wherein further comprising, after solidifying the first substance injected into the cavity into the solid state, performing a planarizing process to the surface of the first substance in the solid state.

10. The method according to claim 8, wherein the first substance is selected from a group consisting of water, oil, and acetic acid.

11. The method according to claim 9, wherein the first substance is selected from a group consisting of water, oil, and acetic acid.

12. The light-adjusting glass according to claim 2, wherein the reflective microstructure comprises one of a hemispherical microstructure and a prismatic microstructure.

13. The light-adjusting glass according to claim 3, wherein the reflective microstructure comprises one of a hemispherical microstructure and a prismatic microstructure.

14. The light-adjusting glass according to claim 4, wherein the reflective microstructure comprises one of a hemispherical microstructure and a prismatic microstructure.

15. The light-adjusting glass according to claim 5, wherein the reflective microstructure comprises one of a hemispherical microstructure and a prismatic microstructure.

16. The light-adjusting glass according to claim 2, wherein the first substance is selected from a group consisting of water, oil, and acetic acid.

17. The light-adjusting glass according to claim 3, wherein the first substance is selected from a group consisting of water, oil, and acetic acid.

18. The light-adjusting glass according to claim 4, wherein the first substance is selected from a group consisting of water, oil, and acetic acid.

19. The light-adjusting glass according to claim 5, wherein the first substance is selected from a group consisting of water, oil, and acetic acid.

* * * * *